(12) United States Patent
Kondo (10) Patent No.: US 7,398,878 B2
(45) Date of Patent: Jul. 15, 2008

(54) CASE FOR DISC-SHAPED RECORDING MEDIUM WITH FUNCTION OF PREVENTING DROPOUT OF HOLDER

(75) Inventor: Tadami Kondo, Kaizu-gun (JP)

(73) Assignee: Kabushiki Kaisha Nihon Video Center, Aichi (JP)

( * ) Notice: Subject to any disclaimer, the term of this patent is extended or adjusted under 35 U.S.C. 154(b) by 672 days.

(21) Appl. No.: 10/870,592

(22) Filed: Jun. 17, 2004

(65) Prior Publication Data

US 2004/0261090 A1   Dec. 23, 2004

(30) Foreign Application Priority Data

Jun. 20, 2003   (JP) ............................. 2003-175919
Feb. 4, 2004    (JP) ............................. 2004-028391

(51) Int. Cl.
B65D 85/57 (2006.01)

(52) U.S. Cl. .................................... 206/308.1; 206/310

(58) Field of Classification Search ......... 206/307–313, 206/493
See application file for complete search history.

(56) References Cited

U.S. PATENT DOCUMENTS

| | | | | |
|---|---|---|---|---|
| 4,874,085 A | * | 10/1989 | Grobecker et al. | 206/308.1 |
| 4,903,829 A | * | 2/1990 | Clemens | 206/308.1 |
| 5,251,750 A | * | 10/1993 | Gelardi et al. | 206/308.1 |
| 5,682,988 A | * | 11/1997 | Salisbury | 206/303 |
| 6,227,362 B1 | * | 5/2001 | Cheung | 206/308.1 |
| 6,547,067 B1 | * | 4/2003 | Liu | 206/308.1 |
| 6,766,904 B2 | * | 7/2004 | Hu | 206/310 |
| 2003/0150755 A1 | * | 8/2003 | Chen | 206/310 |

FOREIGN PATENT DOCUMENTS

| JP | 286337 | 12/1998 |
|---|---|---|
| JP | 2001-206478 | 7/2001 |
| JP | 2003-26271 | 1/2003 |

* cited by examiner

Primary Examiner—Mickey Yu
Assistant Examiner—Jerrold Johnson
(74) Attorney, Agent, or Firm—William L. Androlia; H. Henry Koda (57) ABSTRACT

A case for accommodating a disc-shaped recording medium such as CD or DVD is disclosed. The case included a front lid opened and closed and a body formed with a central button and a holder including an annular piece formed with an engagement groove for engaging a fixing hole of the disc-shaped recording medium with legs. The annular piece is disposed around the button and the holder further includes a spring portion. A force acting so that an upper side of the disc-shaped recording medium is pressed such that the recording medium is depressed and rendered against a force acting so that the button is pushed upward via a second hinge by the spring portion. As a result, the button is prevented from being pushed over its toggle dead point and the disc-shaped recording medium is re-fixed to the annular piece by reduction and/or elimination of the external force.

10 Claims, 9 Drawing Sheets

CASE FOR DISC-SHAPED RECORDING MEDIUM WITH FUNCTION OF PREVENTING DROPOUT OF HOLDER

BACKGROUND OF THE INVENTION

1. Field of the Invention

The present invention relates to a case for accommodating a disc-shaped recording medium, such as a compact disc (CD), digital video disc (DVD) and the like, on which music or an image is recorded.

2. Description of the Related Art

One of conventional cases for carrying a disc-shaped recording medium includes holding means with a central portion which is depressed by a finger such that its diameter is reduced, thereby releasing the recording medium from a held state. For example, Japanese Patent No. 2863317 discloses a compact disc holder including an integrally formed button member having a generally semicircular segment connected via a central hinge to distal ends of two cantilevered arms extending inward from the disc base. A central aperture of the compact is to be fitted with the segment. The central aperture of the disc is placed on the button member and then, the disc is depressed to be fixed and held. On the other hand, when the central portion of the button member is depressed while the disc is held, the arms are flexed to be pushed toward the disc base such that a lip of the button member passes through the central aperture. As a result, the disc is released from engagement with the button member. However, when an unexpectedly large external force acts on the case during handling or transportation, the central portion of the case is sometimes pressed. In this case, the disc held on the button member is detached, whereupon the surface of the disc may be damaged.

In view of the above-described problem, JP-A-2001-206478 discloses an improved disc case. The disclosed case includes a holder including a protrusion limiting the position of the central aperture of the disc and an engagement portion having an engagement portion elastically fitted with an inner wall of the central aperture of the disc limited by the protrusion. The engagement portion includes a cantilevered arm with a distal end on which the button is mounted. The button is depressed to a position immediately before release from the engagement with the disc. The height of the protrusion is set to be substantially the same as the height of the button located at the position immediately before release from the engagement with the disc. As the result of this set height of the protrusion, the button can be prevented from being released from engagement with the disc.

JP-A-2003-26271 filed by the assignee of the present application discloses a case for accommodating a disc-shaped recording medium including a protrusion mounted on the backside of a door. The upper side of the recording medium is pressed directly or indirectly by the protrusion. A lowering operation of the pressing portion of the holder is equalized with a spring of a thrust portion so that the recording medium is prevented from falling off.

Regarding the holder disclosed by the foregoing Japanese Patent No. 2863317, the recording medium would become defective if the surface of the recording medium is damaged during transportation or the like. Further, in the holder disclosed in JP-A-2001-206478, the button-shaped lip engages one inner portion of the central aperture of the disc to hold the disc. Accordingly, the disc is not sufficiently stable when held by the holder. The structure of the case disclosed in JP-A-2003-26271 can prevent the disc from dropping off. However, since the protrusion presses a pamphlet put inside the door, the pamphlet sometimes carries an indication of press.

SUMMARY OF THE INVENTION

Therefore, an object of the present invention is to provide a disc-shaped recording medium case with a function of preventing rash act of a holder, which case can prevent the disc-shaped recording medium from being dropped off during transportation and is suitable for mass production.

The present invention provides a case for accommodating a disc-shaped recording medium which comprises a front lid provided to be opened and closed so that a disc-shaped recording medium such as a compact disc is put in and taken out through a front side of a body, a holder provided for detachably attaching the disc-shaped recording medium to a bottom of the body, the holder including a central button, and a pair of legs disposed at opposite sides of an imaginary line radially extending at equal angle about an imaginary center of the button, each leg having one of two ends connected to a seat by a first hinge disposed on a line perpendicular to the imaginary line, each leg having the other end formed with a thin second hinge by which each leg is connected to a side wall of the button, the holder further including an annular piece formed with an engagement groove for engaging a fixing hole of the disc-shaped recording medium with the legs, the annular piece being disposed around the button, the holder further including a spring portion formed integrally with the holder so as to correspond to an underside of a peripheral edge of the fixing hole, the fixing hole of the disc-shaped recording medium being put onto the annular piece and then pressed so that the disc-shaped recording medium is fixed, the button to which the disc-shaped recording medium is fixed is pressed so that the disc-shaped recording medium is sunk with the button while the annular piece is displaced to the imaginary center and so that the disc-shaped recording medium is restrained from sinking, whereby the disc-shaped recording medium is released from the fixed state. In the above-described construction, the holder is disposed so that tops of the button and the annular piece are located lower than an upper side of the disc-shaped recording medium when the second hinge is located at a toggle dead point on a movement path where the second hinge is linear relative to the first hinge. Further, when the central portion of the case is pressed by an external force thereby to be pushed in a direction in which the button is sunk under a condition where the disc-shaped recording medium is accommodated and the lid is closed, the underside of the lid is pushed upward by the spring portion, and a force acting so that an upper side of the disc-shaped recording medium is pressed such that the recording medium is sunk is rendered competitive against a force acting so that the button is pushed upward via the second hinge by the spring portion, whereupon the button is prevented from being pushed over the toggle dead point and so that the disc-shaped recording medium is re-fixed to the annular piece by reduction and extinction of the external force.

The disc-shaped recording medium can be attached to and detached from the case quickly since the case has such a structure that the button of the holder and the annular piece are caused to come out and set smoothly. Further, the holder is provided with the fall-off preventing function. Accordingly, the central portion of the case is sometimes pressed such that the button portion is pressed in such a direction as to sink when an unexpectedly large external force acts on the case during handling or transportation of the discs. Consequently, the disc-shaped recording medium can be prevented from falling off. Additionally, since the holder is formed integrally with the case, the holder is suitable for mass production and accordingly, the production cost can be reduced.

The case preferably further comprises a floating preventing protrusion provided on an inner side of the lid, the floating preventing protrusion being disposed so as to be adjacent to an upper side of an outer circumferential edge of the case held at a normal height. The central portion of the case is pushed upward by the springing portion when an unexpectedly large external force acts on the case during handling or transportation of the discs such that the button portion is pressed in such a direction as to sink. However, the fall-off preventing function acts so that the upper side of the outer circumferential edge abuts against the floating preventing portion thereby to limit sinking of the button portion. Consequently, the disc-shaped recording medium can be prevented from dropout.

The lid preferably has a recess formed in a backside thereof opposed to the button and the top of the annular portion. Since a large space is ensured by the button portion, the upper side of the annular piece and the backside of the lid, the button portion is hard to be pressed when the central portion of the case is pressed by an unexpectedly large external force. Consequently, the case can be prevented from falling off. In addition, since the space is sufficient, a degree of freedom in the design of the button portion and annular piece can be increased.

The lid preferably has a recess formed in a backside thereof opposed to the button and the top of the annular portion and a protrusion formed on a backside opposed to an upper side of the circumferential edge of the fixing aperture of the disc. This construction provides a large space defined by the upper face of the button portion, the upper side of the annular piece and the backside of the lid. Consequently, since the button portion becomes hard to press when the central portion of the case is pressed by an unexpected external force, the case can further be prevented from falling off. Additionally, since the protrusion provided on the lid restrains the springing portion from springing, the case can further be prevented from dropout.

The button portion protruding from the upper face of the disc held at the normal height preferably has a top with a height set so as to be smaller than a movement distance from an upper dead point of the second hinge and toggle dead point. In this construction, a large space is defined between the upper side of the button portion and the backside of the lid. Accordingly, even when the central portion of the button is pressed by an unexpected external force, the case is prevented from being pushed over the toggle dead point. Consequently, the case can be prevented from falling off. In addition, a finger of the user is easily caught in the fixing aperture and accordingly, the disc-shaped recording medium can smoothly be taken out of the case.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
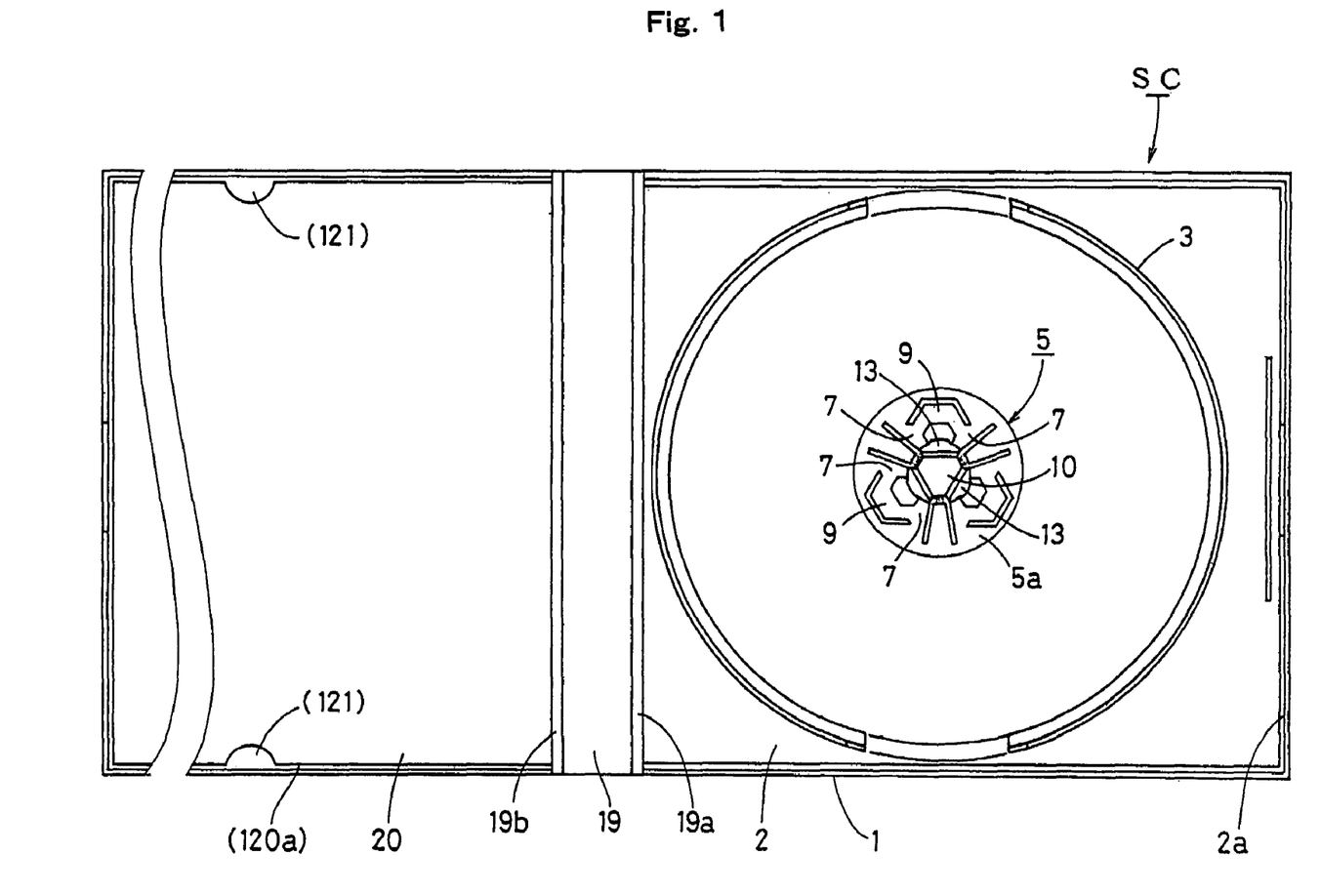
FIG. 1 is a front view of the disc-shaped recording medium case with the lid being open in accordance with one embodiment of the present invention.

An embodiment of the present invention will be described with reference to FIGS. 1 to 5. Referring to FIG. 1, a case SC for accommodating a disc-shaped recording medium is shown. The case is dedicated to purposes of sale and provided with a dropout preventing function. The case SC includes a generally box-shaped body 1 and a lid 20 both of which are integrally made from a synthetic resin. The body 1 includes a substantially square rear 2 and a holder 5 formed on a central portion of the rear. A disc-shaped recording medium a such as a DVD (digital video disc or digital versatile disc) has a fixing hole b which is to be fitted with the holder 5. The rear 2 has a side strip formed integrally along an outer peripheral edge thereof. Two generally arc-shaped protrusions 3 are formed integrally on the rear 2. The protrusions 3 supports an outer circumferential edge of the disc-shaped recording medium a.

Figure 2:
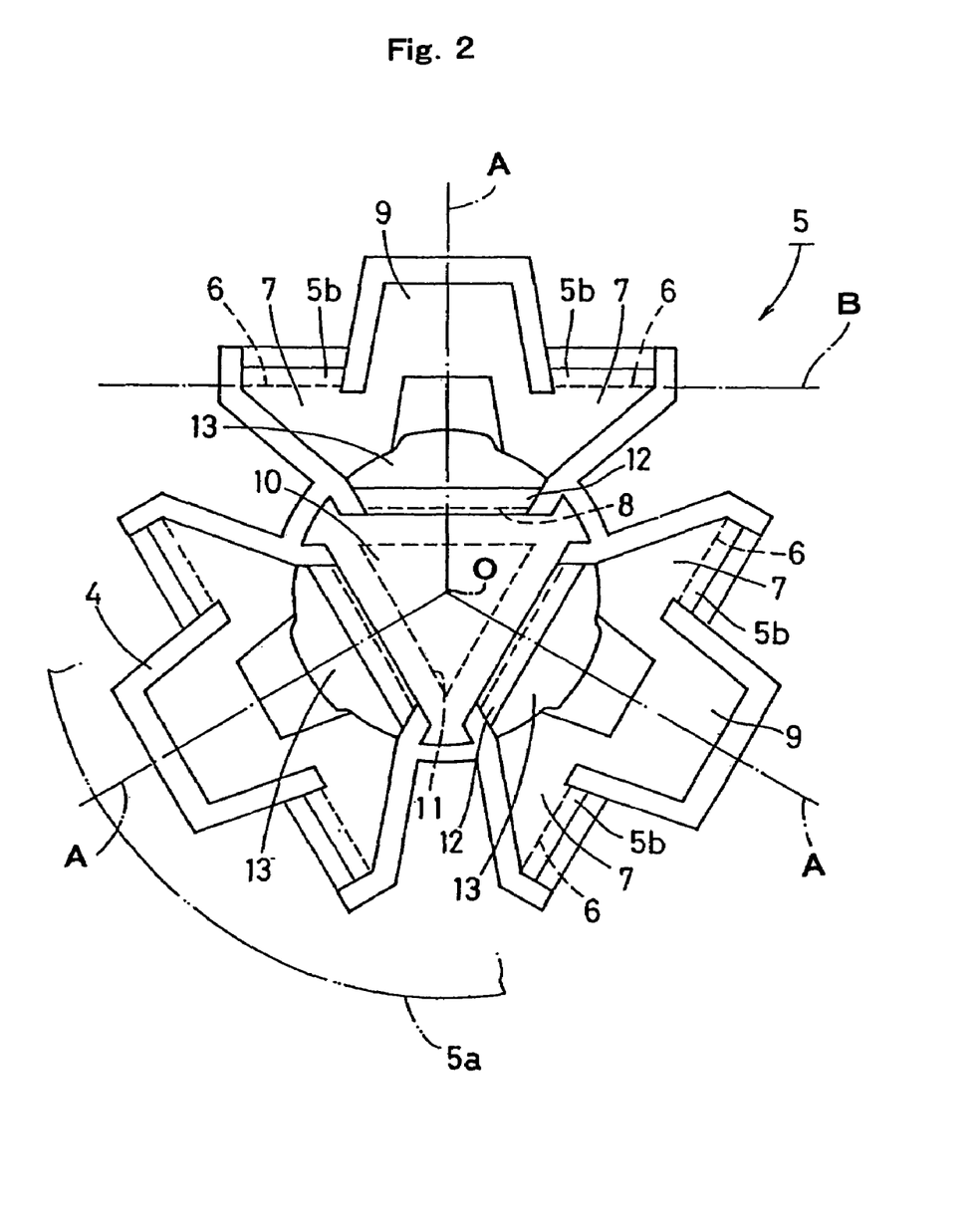
FIG. 2 is a front view of the holder.
Figure 3:
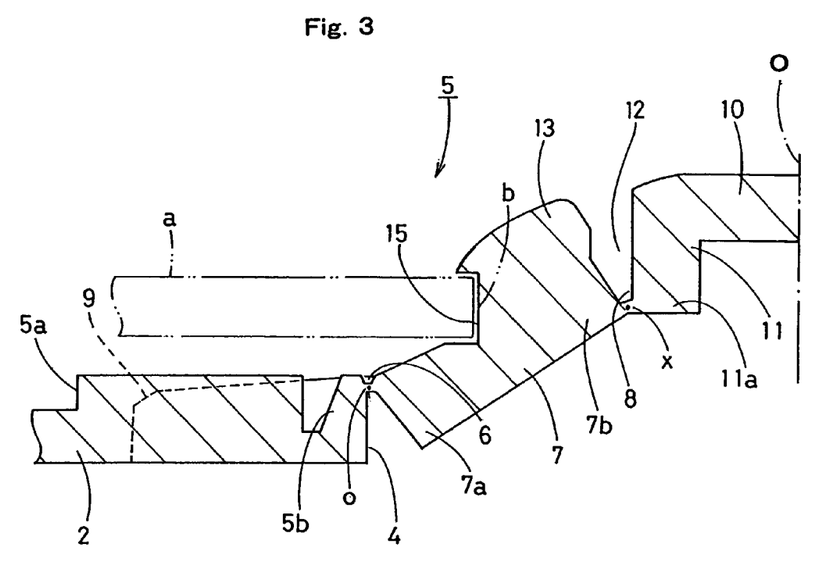
FIG. 3 is a partial sectional view of the holder.

Referring to FIGS. 2 and 3, the holder 5 includes a generally circular seat 5a centrally disposed on the rear 2, a generally triangular button 10 and three pairs of legs 7. The seat 5a has three openings 4. Imagine three imaginary chain lines A radially extending from a center O of the triangular button 10 at equal intervals, that is, at intervals of 120 degrees, as shown in FIG. 2. Each pair of legs 7 are disposed on the center of the corresponding opening 4 so as to interpose the imaginary line A. Two first hinges 6 are disposed on a chain line B perpendicular to each imaginary chain line A. Each leg 7 has one end 7a connected via the first hinge 6 to a connecting portion 5b which is provided on the seat 5a so as to be elastically deformable in the same direction as the imaginary line A extends. Each leg 7 further has the other end 7b formed with a thin second hinge 8 which is connected to a lower end 11a of a side wall 11 of the button 10, as shown in FIG. 3.

Each of three annular pieces 13 has an engagement groove 15 in which the fixing hole b of the disc-shaped recording medium a is locked. The annular pieces 13 are disposed around the triangular button 10 and formed integrally with the paired legs 7 with a groove 12 formed outside the second hinge 8. Each of three spring portions 9 is formed integrally with the paired legs 7 so as to bridge rear portions of the legs 7. Each spring portion 9 is provided so as to correspond to the lower side of the circumferential edge of the fixing hole b of the disc a.

Figure 5:
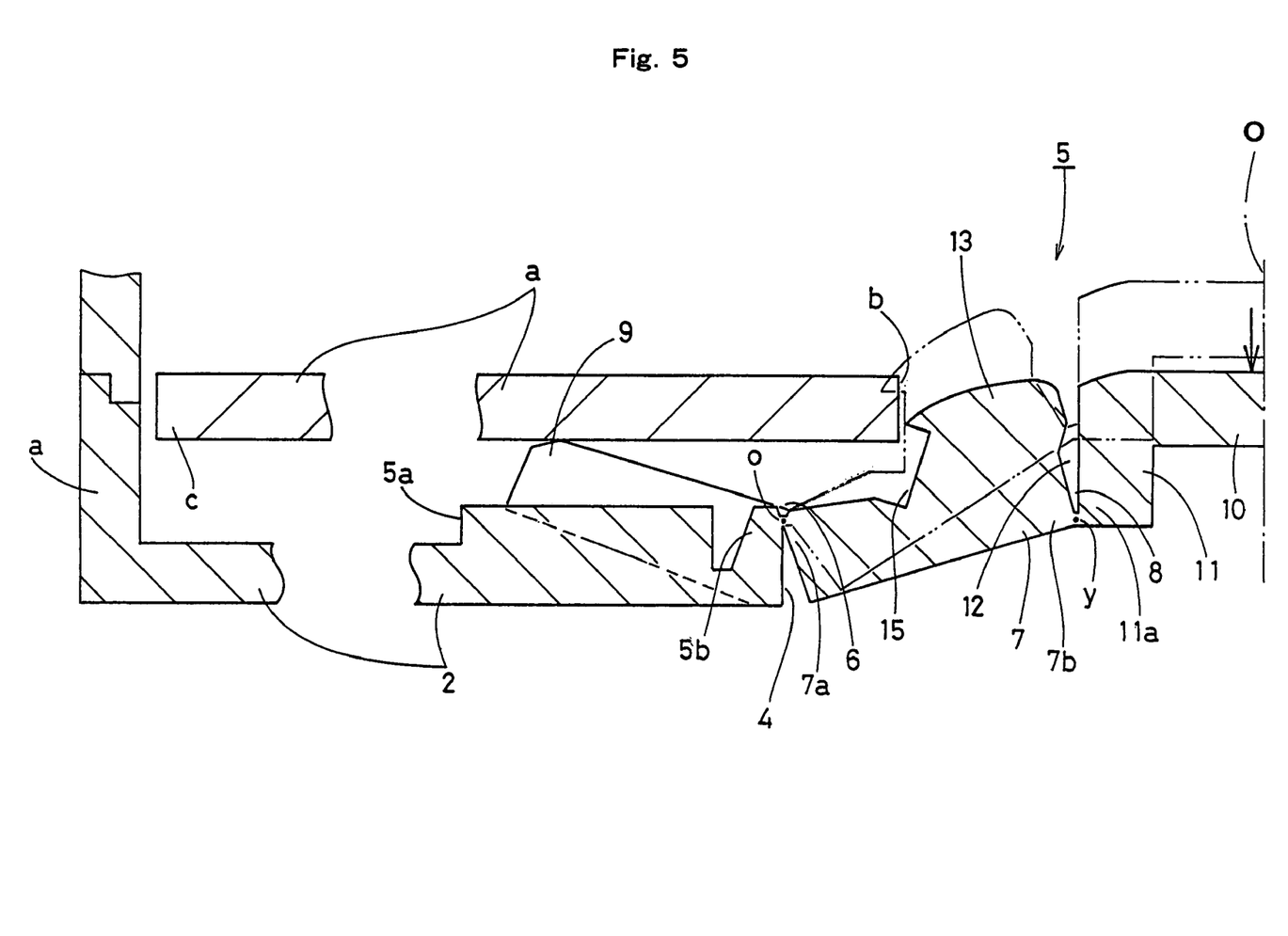
FIG. 5 is also a partial sectional view of the holder in the case where an external force is applied to the lid such that the button is located slightly lower than the upper side of the case.

Referring to FIG. 5, the holder 5 is constructed so that the tops of the button 10 and annular piece 13 are located lower than the upper side of the disc-shaped recording medium a attached to the holder when a bent point of the second hinge 8 is located at a toggle dead point y in a movement path in which the bent point of the second hinge 8 is linear relative to a bent point of the first hinge 6.

A central side piece 19 has a side edge connected via a thin hinge 19a to a left side edge of the body 1 as shown in FIG. 1. A front lid 20 is connected via a thin hinge 19b to the other side edge of the central side piece 19 so as to be opened and closed.

The holder 5 of the disc-shaped recording medium case SC will operate as follows.

When the fixing hole b of the disc-shaped recording medium a is put upon the annular piece 13 of the holder 5 and the peripheral part of the medium is pressed, the annular piece 13 is caused to pass through the fixing hole b while being displaced toward the center of the triangular button 10 to be sunk by elastic deformation of the first and second hinges 6 and 8. Approximately at the same time, the annular piece 13 returns to its previous position (the bent point of the second hinge 8; and upper dead point x). As a result, the fixing hole b is engaged with the engagement groove 15, thereby being held. See FIG. 3.

On the other hand, when the button 10 to which the disc-shaped recording medium a is fixed is pushed by a finger, the annular piece 13 is sunk thereby to re-pass through the fixing hole b. Although the central part of the disc-shaped recording medium a is lowered with the annular piece 13, the underside of the circumferential edge of the fixing hole b abuts against the spring portion 9 such that further lowering is prevented. The annular piece 13 is further lowered so that the disc-shaped recording medium a is released from the fixed state.

Figure 4:
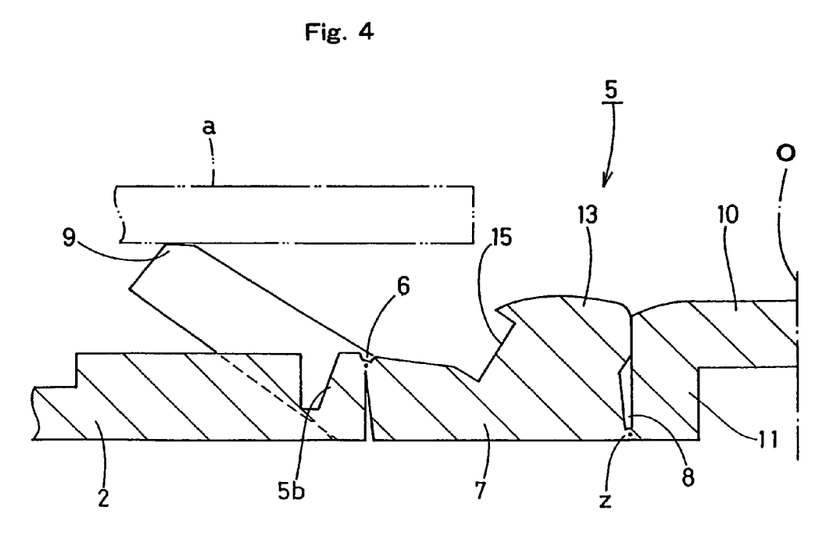
FIG. 4 is also a partial sectional view of the holder in the case where the button has been pushed into.

The button 10 and the annular piece 13 are held at a location further sunk from the location (the bent point of the second hinge 8: lower dead pint z) where the recording medium a is released from the fixed state, as shown in FIG. 4.

The spring portion 9 is pushed such that the annular piece 13 protrudes when the fixing hole b of the recording medium a is put on the annular piece 13 and the recording medium a is pushed inward in the above-described state of the button 10 and the annular piece 13, whereupon the recording medium a is engaged with the engagement groove 15 thereby to be fixed in position.

The following is a case where an unexpectedly large external force presses the central portion of the case SC during handling or transportation so that the case SC is pressed in a direction in which the button 10 is sunk. When the button 10 is pressed by the external force such that the second hinge 8 is moved to the location of the toggle dead point y, the top of the button 10 is located slightly lower than the upper side of the recording medium a raised by the spring portion 9, as shown in FIG. 5. As a result, the upper side of the recording medium a is pressed by the backside of the lid 20 of the case SC. Accordingly, the force pushing the recording medium a downward is rendered against the force raising the button 10 via the second hinge 8 by the spring portion 9. Consequently, the button 10 is prevented from being raised over the toggle dead point y and accordingly, the external force is reduced or eliminated, whereupon the recording medium a is re-fixed to the engagement groove 15.

Figure 6:
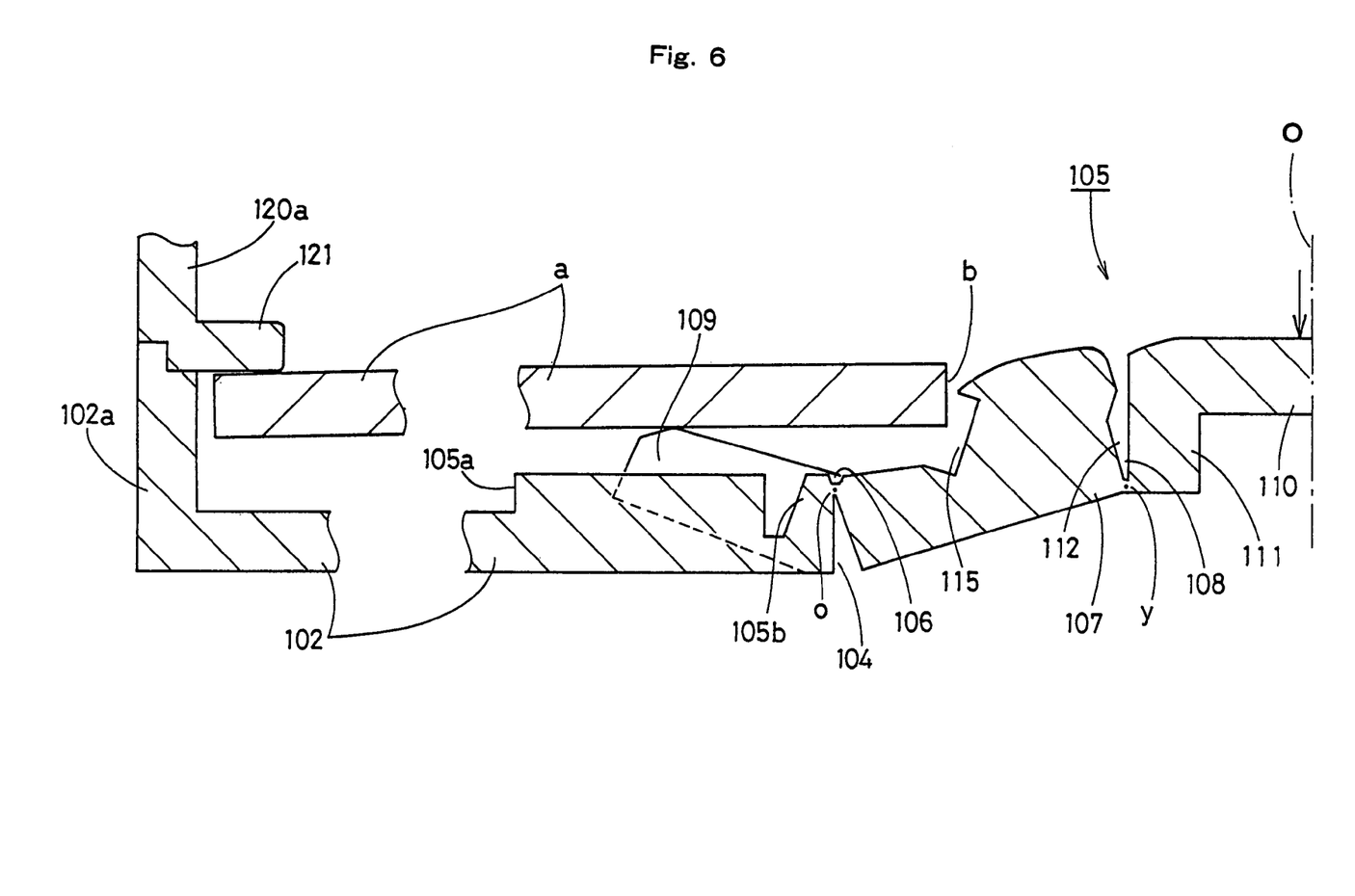
FIG. 6 is also a partial sectional view of the holder in a second embodiment of the invention, showing the case where an external force is applied to the lid such that the button is located slightly higher than the upper side of the case, whereby the floating preventing protrusion is in operation.
Figure 7:
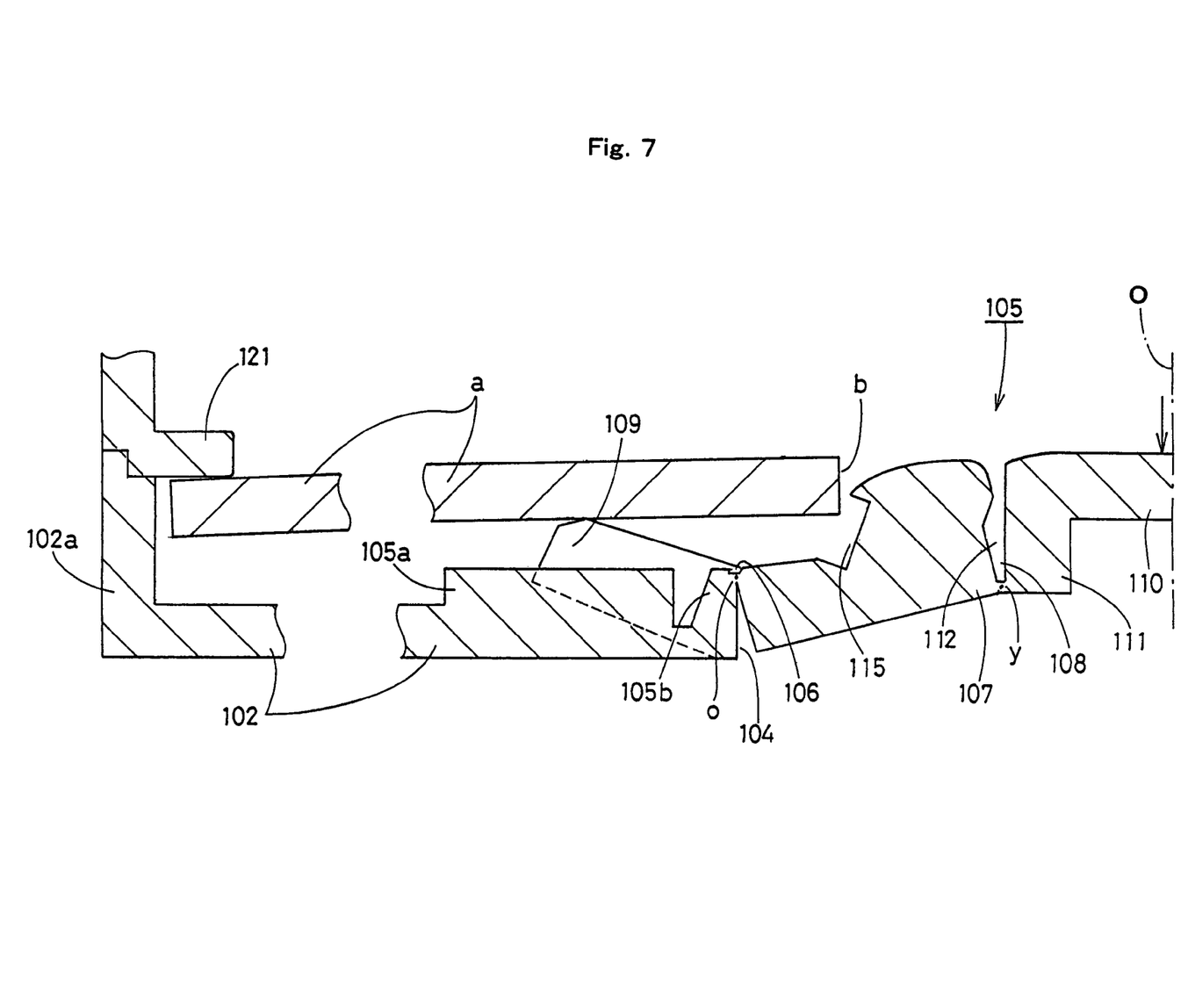
FIG. 7 is also a partial sectional view of the holder in the second embodiment, showing the case where the button is slightly sunk in the state shown in FIG. 6 such that the button is located substantially as high as the upper side of the case and such that the central portion of the case is deformed into a convex shape.

FIGS. 6 and 7 illustrate a second embodiment of the invention. The second embodiment differs from the first embodiment in that the spring portion 109 has a length slightly smaller than the spring portion 9 of the holder 5 in the first embodiment and the lid 120 is provided with a floating preventing protrusion 121. The other elements of the case SC in the second embodiment is the same as that in the first embodiment. The similar parts are labeled by the same reference symbols as those in the first embodiment. The description of these parts will be eliminated.

A pair of floating preventing protrusions 121 are formed integrally on the opposite inner sides 120a of the lid 120. The protrusions 121 are located on the line passing the center C of the holder 105 as viewed from the front. Each floating preventing protrusion 121 is adjacent to the upper side of outer circumferential edge of the recording medium a. It is desirable that a space (not shown) should be defined between the backside of the lid 120 and floating preventing protrusions 121 so that a pamphlet or the like is accommodated in the space.

The holder 105 operates in the same manner as in the first embodiment when the recording medium a is attached to and detached from the case. Here, a case will be described where an unexpectedly large external force presses the central portion of the case SC during handling or transportation so that the case SC is pressed in a direction in which the button 110 is sunk.

When the button 110 is pressed by the external force such that the second hinge 108 is moved to the toggle dead point y, the top faces of the button 110 and annular piece 113 are located slightly higher than the central portion of the recording medium a, as shown in FIG. 6. An upper side of the outer circumferential edge of the recording medium a abuts against the floating preventing protrusions 121, and the central potion of the recording medium a is raised by the spring portion 109 such that the recording medium a is elastically deformed. In this case, the floating preventing protrusions 121 have a function of preventing the button from sinking, so that the external force is reduced or eliminated and the recording medium a is re-fixed to the engagement groove 15.

Further, when the button 110 in the pressed state of FIG. 6 is further pressed as shown in FIG. 7, the button 110 which has been pushed over the toggle dead point y is returned by a recovering force due to elastic deformation of the recording medium a. The external force is then reduced or eliminated and the recording medium a is re-fixed to the engagement groove 15.

Figure 8:
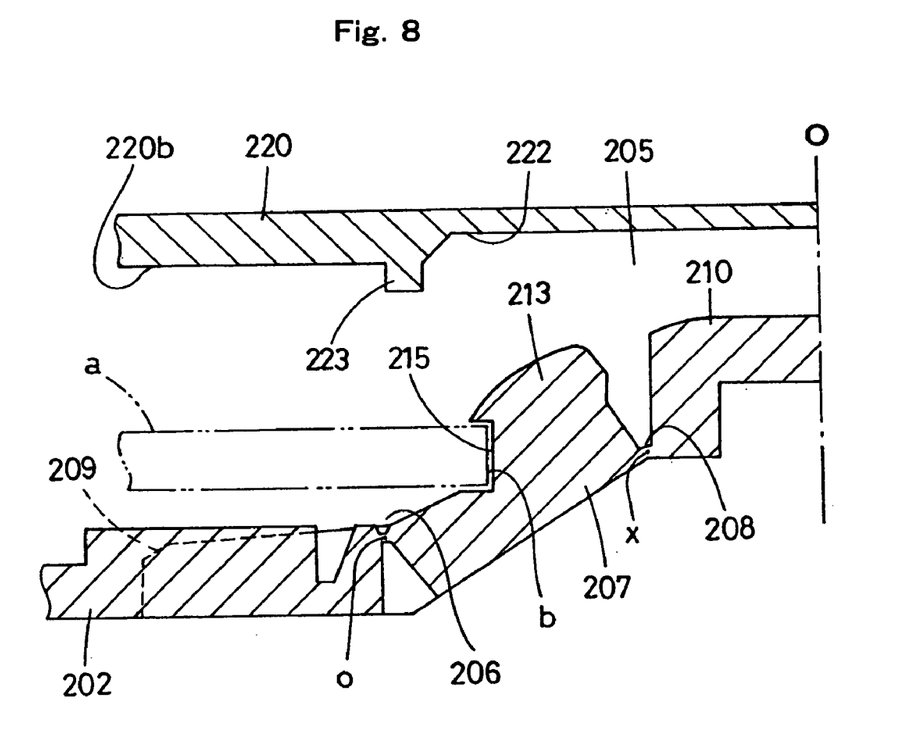
FIG. 8 is a partial sectional view of holder in the normal state in a third embodiment of the present invention, showing the positional relation among a part of the lid, button and annular piece.
Figure 9:
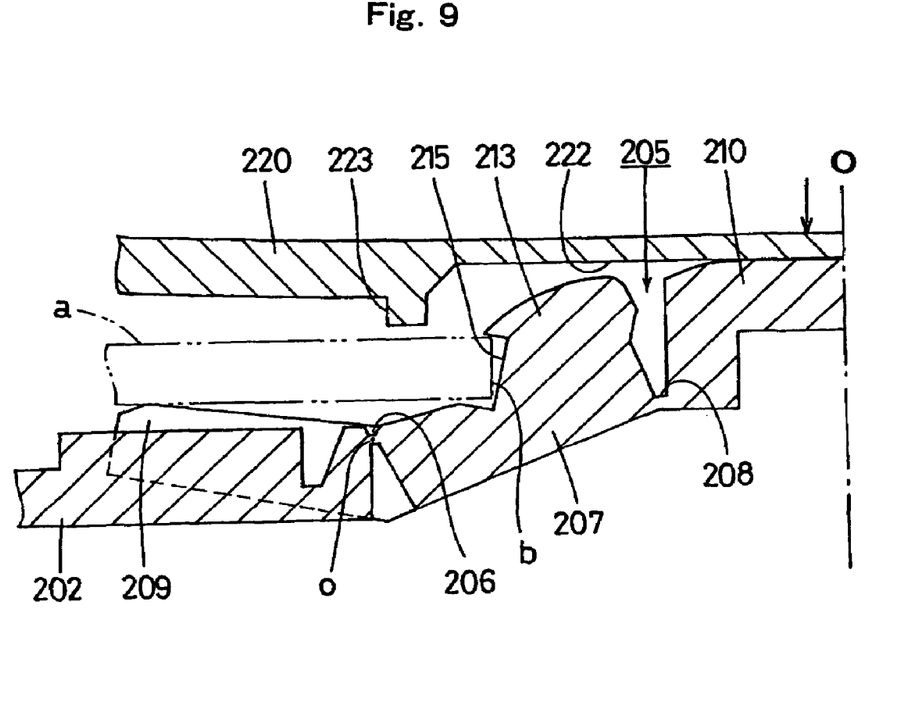
FIG. 9 is a partial sectional view of the holder in the third embodiment of the invention, showing the case where an external force is applied to the lid such that the button is located slightly higher than the upper side of the case.

FIGS. 8 and 9 illustrate a third embodiment of the invention. The third embodiment differs from the first embodiment in that a recess 222 is formed in a portion of the lid 220 opposed to the tops of the button 210 and annular piece 213 of the holder 205 and a protrusion 223 is provided on a portion of the lid 220 opposed to the upper side of circumferential edge of the fixing hole b of the recording medium a.

The recess 222 with a predetermined depth is formed in the portion of the backside 220b of the lid 220 so as to be opposed to the tops of the button 210 and annular piece 213, as shown in FIG. 8. Further, the protrusion 223 with a predetermined height is formed integrally on the portion of the lid 220 opposed to the upper side of circumferential edge of the fixing hole b of the recording medium a.

The holder 205 operates in the same manner as in the first embodiment when the recording medium a is attached to and detached from the case SC. Here, a case will be described where an unexpectedly large external force presses the central portion of the case SC during handling or transportation so that the case SC is pressed in a direction in which the button 210 is depressed.

When the button 210 is pressed by the external force such that the second hinge 208 is moved from the state as shown in FIG. 9 to the toggle dead point y, the upper side of the recording medium a is pressed by the protrusion 223 of the lid 220. The force depressing the recording medium a is rendered against the force raising the button 210 via the second hinge 208 by the spring portion 209. Consequently, the button 210 is prevented from being raised over the toggle dead point y and accordingly, the external force is reduced or extinguished, whereupon the recording medium a is re-fixed to the engagement groove 215.

Figure 10:
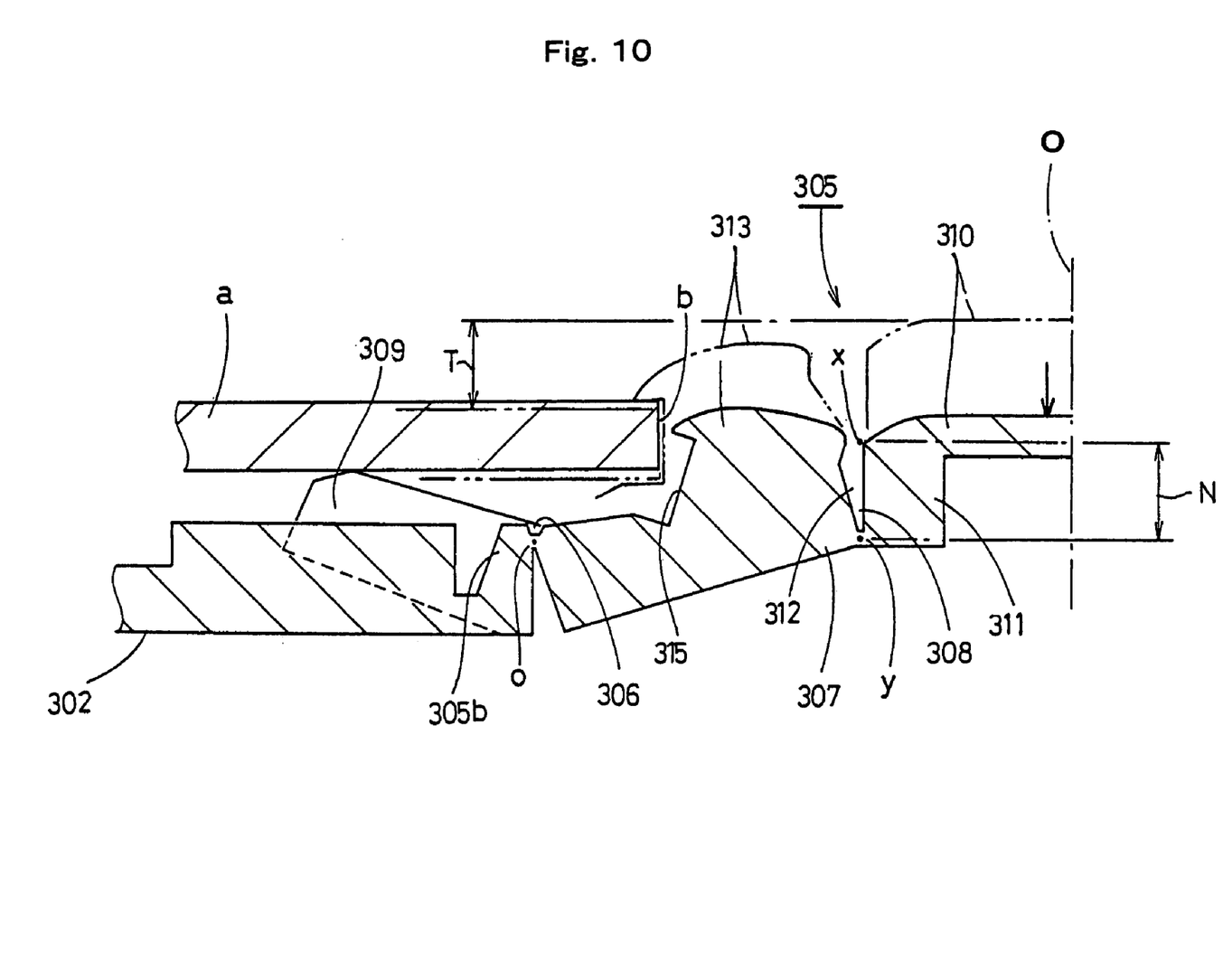
FIG. 10 is a partial sectional view of the holder in the case where an external force is applied to the lid such that the button is located slightly lower than the upper side of the case.

FIG. 10 illustrates a fourth embodiment of the invention. Reference symbol T designates a height of the top of the button 310 protruding from the upper side of the recording medium a held at a normal height. Reference symbol N designates a distance between the upper dead point x of the second hinge 308 and the toggle dead point y. The fourth embodiment differs from the first embodiment in that the height T of the top of the button 310 is smaller than the distance N.

The holder 305 will operate as follows where an unexpectedly large external force presses the central portion of the case SC during handling or transportation, as shown in FIG. 10. When the button 310 is pressed by the external force such that the second hinge 308 is moved to the toggle dead point y, the recording medium a is raised by the spring 309 operated in synchronization with the sinking of the button 310, so that the backside of the lid (not shown) of the case presses the upper side of the recording medium a. In this case, the force depressing the recording medium a is rendered against the force raising the button 310 via the second hinge 308 by the spring portion 309. Since the height T of the top of the button 310 is smaller than the distance N between the upper dead point x of the second hinge 308 and the toggle dead point y, the button 310 is prevented from being pushed over the toggle dead point y, whereupon the recording medium a can be prevented from being dropped out.

As obvious from the foregoing, the recording medium can be prevented from being dropped out during the transportation of the recording medium enclosed in the case. Further, since the holder can be formed integrally with the case, the case is suitable for mass production and accordingly, the production costs can be reduced.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A case for accommodating a disc shaped recording medium comprising:
a front lid provided to be opened and closed so that the disc shaped recording medium is put in and taken out through a front side of the case,
a holder provided for detachably attaching the disc shaped recording medium to a bottom of the body, the holder including a central button, and three pairs of legs each disposed at opposite sides of one of three imaginary lines radially extending at equal angles about an imaginary center of the button, each leg having one of two ends connected to a seat formed integrally with the bottom of the body by a first hinge disposed on a line perpendicular to the corresponding imaginary line, each leg having the other end formed with a thin second hinge for connecting each leg to a sidewall of the button, three annular pieces each formed integrally with a pair of legs and with an engagement groove for engaging a fixing hole of the disc shaped recording medium with the legs, each annular piece being disposed around the button, a spring portion formed integrally with each pair of legs so as to correspond to the underside of the disc shaped recording medium, wherein
the fixing hole of the disc shaped recording medium is inserted onto the annular pieces causing the disc shaped recording medium to be fixed thereto, the disc shaped recording medium is released when the button to which the disc shaped recording medium is fixed is pressed, the disc shaped recording medium initially moves downwardly with the button, further downward movement of the button causes the springs to engage the underside of the disc shaped recording medium, thus restraining the disc shaped recording medium from further downward movement, the annular pieces pass downwardly through the fixing hole of the restrained disc shaped recording medium and the disc shaped recording medium is released.

2. A case according to claim 1, further comprising a floating preventing protrusion provided on an innerside of the lid, the floating prevention protrusion being disposed so as to be adjacent to an upperside of an outer circumferential edge of the fixing hole of the disc when the case is closed.

3. A case according to claim 2, wherein the lid has a recess formed in a backside thereof opposed to the top of the button and the annular pieces and a protrusion formed on a backside opposed to an upperside of the outer circumferential edge of the fixing hole of the disc.

4. A case according to claim 2, wherein the button protruding from the upper face of the disc held at a normal height has a top with a height set so as to be smaller than a movement distance from an upper dead point of the second hinge and a toggle dead point.

5. A case according to claim 1, wherein the lid has a recess formed in a backside thereof opposed to the top of the button and the annular pieces.

6. A case according to claim 5, wherein the lid has a recess formed in a backside thereof opposed to the top of the button and the annular pieces and a protrusion formed on a backside opposed to an upperside of an outer circumferential edge of the fixing hole of the disc.

7. A case according to claim 5, wherein the button protruding from the upper face of the disc held at a normal height has a top with a height set so as to be smaller than a movement distance from an upper dead point of the second hinge and a toggle dead point.

8. A case according to claim 1, wherein the lid has a recess formed in a backside thereof opposed to the top of the button and the annular pieces and a protrusion formed on a backside opposed to an upperside of an outer circumferential edge of the fixing hole of the disc.

9. A case according to claim 8, wherein the button protruding from the upper face of the disc held at a normal height has a top with a height set so as to be smaller than a movement distance from an upper dead point of the second hinge and a toggle dead point.

10. A case according to claim 1, wherein the button protruding from the upper face of the disc held at a normal height has a top with a height set so as to be smaller than a movement distance from an upper dead point of the second hinge and a toggle dead point.

* * * * *